US008018307B2

(12) United States Patent
Van Beek et al.

(10) Patent No.: US 8,018,307 B2
(45) Date of Patent: Sep. 13, 2011

(54) MICRO-ELECTROMECHANICAL DEVICE AND MODULE AND METHOD OF MANUFACTURING SAME

(75) Inventors: Jozef Thomas Martinus Van Beek, Eindhoven (NL); Peter Gerard Steeneken, Eindhoven (NL)

(73) Assignee: NXP B.V., Eindhoven (NL)

( * ) Notice: Subject to any disclaimer, the term of this patent is extended or adjusted under 35 U.S.C. 154(b) by 1294 days.

(21) Appl. No.: 10/561,854

(22) PCT Filed: Jun. 23, 2004

(86) PCT No.: PCT/IB2004/050974
§ 371 (c)(1),
(2), (4) Date: Dec. 21, 2005

(87) PCT Pub. No.: WO2004/114345
PCT Pub. Date: Dec. 29, 2004

(65) Prior Publication Data
US 2006/0146472 A1    Jul. 6, 2006

(30) Foreign Application Priority Data

Jun. 26, 2003  (EP) .................. 03101911
Oct. 31, 2003  (EP) .................. 03104042

(51) Int. Cl.
*H01H 51/22* (2006.01)
(52) U.S. Cl. ........................ 335/78; 200/181
(58) Field of Classification Search ............ 335/78; 200/181; 333/101
See application file for complete search history.

(56) References Cited

U.S. PATENT DOCUMENTS

| 5,235,225 | A  | * | 8/1993  | Colgate et al. ........... 310/309 |
| 6,160,230 | A  |   | 12/2000 | McMillan et al. |
| 6,218,911 | B1 | * | 4/2001  | Kong et al. ............... 333/101 |
| 6,310,526 | B1 |   | 10/2001 | Yip et al. |
| 6,366,186 | B1 |   | 4/2002  | Hill et al. |
| 6,373,007 | B1 |   | 4/2002  | Calcatera et al. |
| 6,472,739 | B1 |   | 10/2002 | Wood et al. |
| 6,538,874 | B2 |   | 3/2003  | Pulsford et al. |
| 6,882,256 | B1 | * | 4/2005  | Yip ......................... 333/262 |
| 7,138,893 | B2 | * | 11/2006 | Nakanishi et al. ......... 335/78 |
| 7,250,837 | B2 | * | 7/2007  | Nielson et al. ........... 335/78 |
| 7,405,635 | B2 | * | 7/2008  | Hashimura et al. ....... 333/105 |

(Continued)

FOREIGN PATENT DOCUMENTS

CN    1 296 297 A    5/2001

(Continued)

OTHER PUBLICATIONS

Shikida, M. "Fabrication of an S-Shaped Microactuator," J. of Microelectromechanical Systems, vol. 6, No. 1, pp. 18-24 (Mar. 1997).

*Primary Examiner* — Anh Mai
*Assistant Examiner* — Bernard Rojas

(57) ABSTRACT

The MEMS element of the invention has a first, a second and an intermediate third electrode. It is given an increased dynamic range in that the switchable capacitor constituted by the second and the third electrode is provided in the signal path between input and output, and that the switchable capacitor constituted by the first and third electrode is provided between the signal path and ground. The MEMS element of the invention is very suitable for integration in a network of passive components.

17 Claims, 5 Drawing Sheets

| U.S. PATENT DOCUMENTS | | | | FOREIGN PATENT DOCUMENTS | | |
|---|---|---|---|---|---|---|
| 2002/0153236 A1 | 10/2002 | Song et al. | | CN | 1 306 291 A | 8/2001 |
| 2003/0048036 A1 | 3/2003 | Lemkin | | EP | 1 093 142 A2 | 4/2001 |
| 2007/0256917 A1* | 11/2007 | Oberhammer et al. | 200/181 | WO | 00/52722 A1 | 9/2000 |
| 2009/0009925 A1* | 1/2009 | Hilgers | 361/277 | * cited by examiner | | |

MICRO-ELECTROMECHANICAL DEVICE AND MODULE AND METHOD OF MANUFACTURING SAME

The invention relates to an electronic device comprising a microelectromechanical system (MEMS) element, the element having a first and a second electrode and an intermediate beam with a first and a second opposite conductive side faces, the first side face facing the first electrode and the second side face facing the second electrode, which beam is movable to and from the first and the second electrode by application of a driving voltage.

The invention further relates to a module comprising such a device.

Such an electronic device is for instance known from WO-A 00/52722. The known device is a MEMS element in which the electrodes and the beam are provided in planes substantially parallel to a substrate. The intermediate beam is herein a laminate comprising between the two conductive surfaces a first insulating layer, a cantilever beam and a second insulating layer. The side faces are used as control surfaces and provide the capability to use separate driving functions for the top and the bottom switch structures. This allows for simultaneous push and pull operation for enhanced speed. By placing both conductive surfaces at the ground common potential, an electrostatic shield between the signal currents at the cantilever beam and the control signals providing the coulomb forces are provided. This structure thus provides signal isolation enhancement when compared to simpler cantilever beam structures.

It is a disadvantage of the known electronic device that it has an insufficient dynamic range for applications in the RF domain.

It is therefore a first object of the invention to provide an electronic device of the kind mentioned in the opening paragraph with an improved dynamic range.

In accordance with a first aspect of the present invention, there is provided an electronic device comprising a microelectromechanical element (MEMS) device, comprising first and second electrodes and an intermediate beam with first and second opposing conductive side faces, the first side face facing the first electrode and the second side face facing the second electrode, which beam is movable by application of a driving voltage between said first and second electrodes, the device being characterized in that the second electrode and the second conductive side face of the beam form with an intermediate dielectric a first switchable capacitor that is connected in a signal path between an input and an output, and the first electrode and the first conductive side face of the beam form with an intermediate dielectric a second switchable capacitor that is coupled from the signal path to ground.

Surprisingly it has been found that the MEMS element with this connection, wherein one capacitor is in the signal path and the other is connected to ground, provides an improved dynamic range. This connection is in fact a combination of the shunt and the series configuration of conventional MEMS capacitors and switch without any intermediate beam. The element of the invention leads in comparison therewith to a significant higher isolation for a given insertion loss. Whereas conventional RF MEMS capacitive switch show an isolation of −20 dB for −0.1 dB of insertion loss, the element of the invention shows an isolation of −32 dB at the same insertion loss. This improved performance is moreover achieved without increasing the overall device dimensions.

In a first embodiment the beam is embodied as a third electrode. Thus, a much simpler construction for the beam is used than in the state of the art. This has as a first advantage that it has a low stiffness and thus allows for very low actuation voltages, preferably below the battery voltages of a few volts. It has as a second advantage that the manufacturability is improved. In fact, the element of this embodiment can be realized in a thin film process.

In a further embodiment, the surface area of the second electrode is smaller than that of the first electrode. Herewith the switch performance can be tuned and an even higher isolation can be achieved. There are various ways of modifying the surface area of the second electrode; it could be smaller than the third electrode and the first electrode; it could have a limited overlap with the third electrode only. It is however preferable that the second electrode is subdivided into individual segments. Such segmentation allows that the third electrode falls within the boundaries of the second electrode. This allows for a good design of the surface area ratio between the first and the second electrode. Furthermore, it creates space under the third electrode. This has the benefit that the sticking problem of the third electrode to the second electrode is diminished. If desired it could be diminished actively, using flow of air, or by filling the spaces between the segments with another material that does not show any attracting interaction with the material of the third electrode. With such an embodiment, the isolation can be improved to −38 dB. The effect of segmentation is considerable in total; for a fourfold increase of the capacitor coupled to ground (with respect to the series capacitor), the dynamic range is enlarged tenfold.

It is preferred for this construction that the MEMS element is of the horizontal type, e.g. that the first and second electrode are present in planes that are substantially parallel oriented with respect to the substrate. The term substantially parallel should be seen in comparison to the vertical type of MEMS elements, which is for instance used in accelerometers.

It is further preferred that the second electrode is present on the substrate surface as it is easier to subdivide the second electrode into individual segments if it is present on the substrate.

It is even more preferred that the first electrode is embodied in a layer with a spring constant that is substantially larger than the spring constant of the beam. The first electrode is generally constructed in a bridge like form. For a stable operation, the movement of the bridge induced by the driving voltage should be negligible compared to the beam movement. Furthermore, there is a risk of resonating behavior of this first electrode if the beam is moved upwards or downwards if the bridge is not stiff enough. This is undesired. Increasing the stiffness of the layer of the first electrode takes away this problem. The stiffness of the layer can be increased by increasing the thickness of the layer, for instance to the order of 1-10 microns, or by using a material with a higher stiffness that nevertheless has good electrical conductivity. Examples hereof are alloys of Al and Ti and of Al and Cu, with preferably 1-5% of the alloying element.

It is further preferred that the first electrode is connected to ground, since it has an increased thickness. The increased thickness results in a higher electrical conductivity, such that the ground has also a real ground potential.

The term "conductive side faces" should not exclude the case that these faces are covered with a thin layer of insulating material. In fact, if Al is used for the third electrode, a native oxide of $Al_2O_3$ can be formed. This is particularly preferred in the case where the first and second electrode not only function as signal electrodes, but also as actuation electrodes. Also the third electrode can be given both functions. The dielectric serves then as a protection to prevent short-circuitry.

The first and second switchable capacitors can be applied both as capacitors and as switches. If the capacitive behavior towards ground is desired, a dielectric layer can be present on top of the second electrode. A suitable dielectric is for instance silicon nitride, tantalum oxide etc.

The invention further relates to an electronic device comprising a microelectromechanical systems (MEMS) element provided on a substrate, comprising first and second electrodes, which electrodes are provided in planes that are substantially parallel to the substrate, an intermediate beam being provided between said first and second electrodes, said intermediate beam having first and second opposing conductive side faces, the first side face facing the first electrode and the second side face facing the second electrode, which beam is movable by application of a driving voltage between said first and second electrodes.

It is a second object of the invention to provide such an electronic device, that is easy to manufacture and enables superior electrical performance.

This object is achieved in that the first and second conductive side faces are part of the same electrically conductive layer being a third electrode. Herewith, use can be made of a thin-film process with three metal layers. Such a thin-film process can be controlled more easily.

It is an advantage of the present invention, that this MEMS element with three electrodes has good electrical performance, particularly if connected in the further shown manner. The third electrode can be put both in contact with the first electrode and with the second electrode. If attached to the first electrode, the electrical contact is rather good, resulting in a very low isolation loss. If attached to the second electrode, the isolation loss is rather high, up to −40 dB.

The properties of the element can be optimized for use as a capacitor, sensor or switch. If meant for use as a variable capacitor, the shapes of the first and second electrodes can be chosen differently, so as to have another capacitive area between the first and the third electrode than between the second and the third electrode.

If meant for use as a switch, the overlap between the electrodes can be reduced so as to prevent sticking behavior. Also, the area of contact at the first and second electrodes need not be chosen at the same location; i.e. when projecting the first electrode on top of the metal layer of the second electrode, there need not be any overlap between the first and the second electrode. This can be achieved in adequate patterning of the electrodes. This reduced area allows a larger freedom of design of the electrodes, and thus enables optimal RF properties of the device. The parasitic capacitance of the substrate may be reduced, and the location can be chosen such that interconnects may have stripline character through coupling to a ground plane or ground interconnect (e.g. to act as a transmission line or coaxial structure).

An alternative implementation of the desired patterning of the electrodes is that surface layers are provided at one or both electrodes, which include windows for making contact. The use of one or two of such surface layers may reduce any sticking behavior, as the interface between the electrodes will not be completely flat. This will not be detrimental to the electrical contact, as the results without such surface layer show that there is some space for compromising. The use of a surface layer is particularly suitable for the second electrode. If the MEMS element is integrated in a passive network with capacitors, a patterned dielectric layer of relatively small thickness is present anyway on top of the metal layer in which the second electrode is defined. There is no problem to pattern it adequately such that it the exposed area of the second electrode is smaller than that of the third electrode.

In a further embodiment, the MEMS element is provided with a spring like element in its construction. Such springs like constructions are known per se in the field of MEMS elements. Basically, the bridge-like or membrane-like construction, acting in the invention as the first electrode, is connected to the substrate through a number of beams that are present laterally to this construction. These beams have a larger elasticity and hence can vibrate. Therewith they are equivalent to springs. The beams may have a desired design which for instance includes an angle.

Such a construction is particularly advantageous in connection with the invention in that it allows movement of the first electrode. This further extends the range of capacitances. Furthermore it allows switching between three or more states: the fully-closed state with all three electrodes attached to each other; a first half-open state, with the third electrode attached to the first electrode, a second half-open state with the third electrode attached to the second electrode; and also the fully-open state with the third electrode not being attached to either the first or the second electrode. For this last state it is preferred that also the third electrode is supported with a construction including springs. Another advantage hereof is the fact that at the same driving voltage a force which is for instance 6.75 times as high is available to counter any stiction force. This improves the reliability of the device.

In a suitable embodiment, the second electrode is substantially elastic. This allows that the second electrode can be rolled off. This means that part of the second electrode will be in a position attached to the first electrode, and part of the second electrode will be in a position very near to the second electrode. The elastic behavior of the second electrode can be realized in the choice of the material and the thickness of the second electrode. Thin metal layers of for instance gold, silver, copper and aluminum are elastic enough. The elasticity can further be tuned by alloying it with suitable elements, for instance in the case of aluminum with about 0.5-2% copper. This alloy shows a similar hardness as pure aluminum, but has a substantially reduced creep.

This embodiment is particularly suitable if the third electrode forms with at least one of the other electrodes forms a capacitor. The advantage is that the capacitor has a continuous tuning range that is considerably extended, particularly in comparison with a variable capacitor having only a first and a second electrode.

The tuning of the capacitance is accomplished by changing the electrode area and/or by using different dielectrics on the surfaces of the first electrode and of the second electrodes.

The first implementation is thus that the dielectric constant of the dielectric layers on the surfaces of the first and the second electrode is different. It is not impossible to use on the one surface a layer with a relatively high dielectric constant, such as silicon nitride, tantalum oxide or even perowskite ceramics such as lead zirconium titanate and the like, while on the other surface a layer with a low dielectric constant is used, such as benzocyclobutene, a mesoporous organically modified silica or the like.

The second implementation is that the first and second electrodes have dissimilar shapes. Such shapes may be that the electrodes are patterned to be present only locally. In view of the usual bridge-construction of the first electrode, this relates primarily to the shape of the second, bottom electrode. It may further be subdivided into a number of segments. Particularly suitable appears a segmentation into triangular segments. This allows a continuous change of the electrode area and at the same time results in the fact that the segments are mutually connected inside this electrode.

It is highly preferred that the layer in which the first electrode is present has a sufficient mechanical strength so as to have a bridge-like construction, and at the same time has a sufficient electrical conductivity for acting as interconnect in RF applications. This can be accomplished by choosing the material adequately.

In a further embodiment, this MEMS element is integrated in a passive network. Inductors can be defined in the layer in which also the first electrode is defined, and which is given a larger thickness and/or another material composition, so as to increase its stiffness in comparison with the third electrode. Electrodes of thin film capacitors can be defined in the same layers as the second and third electrodes. The dielectric layer thereof could even cover the second electrode of the MEMS element, if it is to be used specifically as a tunable capacitor instead of a switch. The process of manufacturing such a passive integration process with good capacitors, good inductors and good interconnects that is applicable in the RF domain, is known from U.S. Pat. No. 6,538,874, that is included herein by reference.

The implementations and embodiments as described above are also applicable here.

The substrate of this MEMS process is preferably insulating or semi-insulating. Examples of such substrates include GaAs, glass, alumina, and ceramics with or without internal conductors. The choice of the ceramic may optimize the thermal expansion behavior. It is, however, preferred to use high-ohmic silicon as the substrate. Both polycrystalline silicon and high-ohmic monocrystalline silicon, that is made high ohmic by implantation with ions such as He or Ar, can be used. A silicon substrate with an amorphous top layer is another suitable option.

The electronic devices of the invention are very suitable for use in impedance matching. Particularly preferred is the application of impedance matching networks for the antenna in mobile phones, wherein the antenna switches for switching between the receive and the transmit paths and between the different frequency bands are included. However, the impedance matching is also suitable at other locations, for instance at the power amplifier, at the transceiver.

The available prior art does not teach the present invention.

Both EP1093142 and WO00/52722 show structures in which the intermediate electrode is a laminate of several layers. That does not enable simple manufacturing on an industrial scale.

US2002/0153236 shows a structure with an intermediate electrode (FIG. 20), but this is a vertical MEMS construction (as used for sensors), not a horizontal structure.

U.S. Pat. No. 6,310,526 describes a structure with a magnetic actuation principle. Herein the MEMS is a switch between an input and two output microstrips. Thickness values are given (0.5-10 um) for the microstrips, but this is dependent on the microstrip behavior solely. Neither is the suggestion given to connect one of the two outputs to ground, and use the switches as capacitors as well, nor is shown the manufacture of the device shown.

US2003/0048036 shows a MEMS structure that operates on the basis of comb-finger sensor-actuator. The patent discusses at the beginning the electrostatic MEMS structure used in the invention, and states clearly the differences to the comb-finger sensor/actuator.

These and other aspects of the present invention will be apparent from and elucidated with reference to the embodiments described hereinafter.

Embodiments of the present invention will now be described by way of examples only and with reference to the accompanying drawings, in which.

Equal constituent parts in different figures will be referred to by the same reference numbers. The drawings are purely diagrammatical.

Figure 1A:
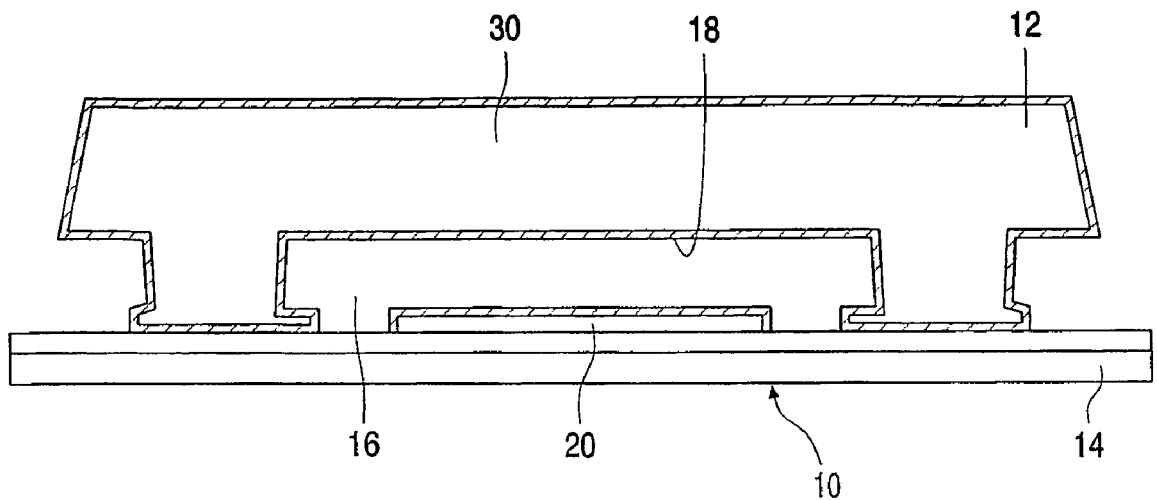
FIG. 1A is a schematic cross-sectional view of a switchable MEM capacitor.
Figure 1B:
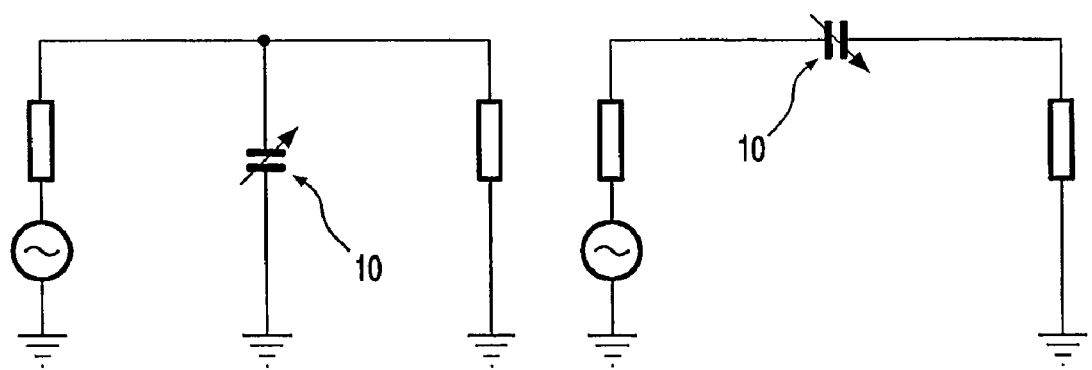
FIG. 1B shows schematic circuit diagrams illustrating that the device of FIG. 1A can either be used in shunt or series configuration.

Referring to FIG. 1A of the drawings, a conventional switchable MEM capacitor 10 comprises a body 12 mounted on a substrate 14 with a recess 16 therebetween. A first electrode 30 is defined in the body 12. A second, fixed electrode 20 is provided on top of the substrate 14. In use, the free-standing first electrode 30 is pulled down to the bottom electrode 20 by applying a DC drive voltage between the first and second electrodes 30, 20. In its extreme situation, the surface 18 of the first electrode 30 will contact the second electrode 20. As illustrated in FIG. 1B of the drawings, the MEM device 10 can be operated in either a shunt or series configuration.

In principle, capacitive MEMS switches, such as the one described above, offer a high isolation combined with a low insertion loss compared with their semiconductor counterparts (e.g. p-I-n diodes and field effect transistors). As noted above, these conventional MEMS (capacitive, as opposed to galvanic contact) switches are used in either a shunt or series configuration. In practice, however, the dynamic range of this type of capacitive switch is limited by the capacitance density that can be obtained when the top electrode is pulled down to the bottom electrode 20. In particular, the surface roughness of the contacting electrodes leads to a relatively low capacitance density when the switch is closed. For example, a 500 nm thick layer of sputtered aluminum has a surface roughness $R_a \sim 10$ nm. This leads to a residual air gap between the electrodes of approximately 30 nm when they are pulled together. In practice, the effective air gap leads to a capacitance density of 300 pF/mm$^2$, when the free-standing electrode is pulled down to the bottom electrode 20. For a typical device layout, this leads to an isolation of only −20 dB for an insertion loss of −0.1 dB. The dynamic range can be increased by increasing the dimensions of the switch 10 (i.e. by increasing the electrode area and gap between the top and bottom electrodes). In practice, however, this leads to unacceptably large devices (i.e. electrode areas of several mm$^2$ and gaps>10 μm).

Figure 2:
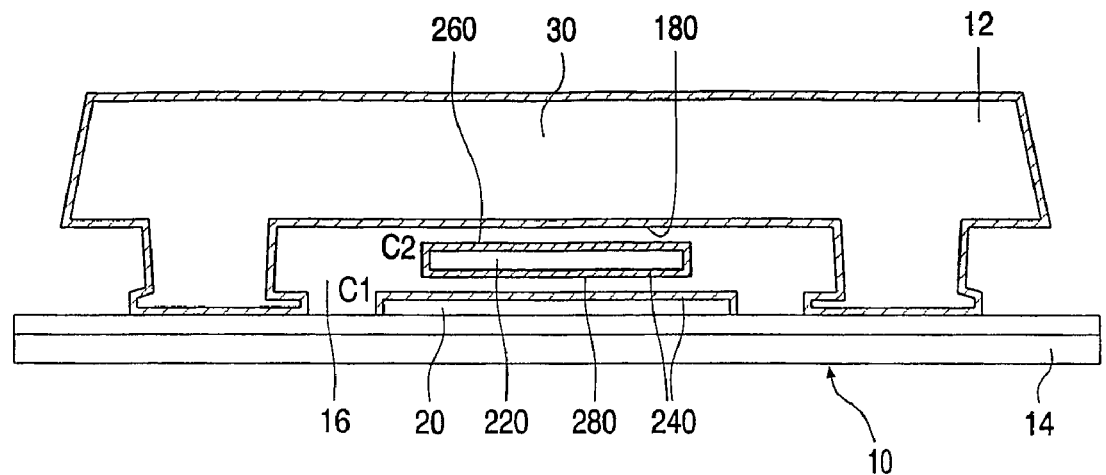
FIG. 2 is a schematic cross-sectional view of a bi-stable MEMS element according to an exemplary embodiment of the present invention.

Referring now to FIG. 2 of the drawings, a MEM switchable capacitor 10 according to an exemplary embodiment of the present invention comprises a body 12 mounted on a substrate 14 with a recess 16 therebetween. The first electrode 30 is defined in the body 12, and the second electrode 20 is present on the substrate 14. The device further comprises an intermediate beam 220, comprising a free-standing thin film, between the first and second electrodes and substantially parallel thereto, the intermediate beam 220 forming a third electrode of the element. In other words, the device comprises three electrodes 30,20, 220, two of which are suspended above the substrate 14. In use, the switching action is performed by pulling the middle electrode 220 to either the top or bottom fixed electrode 30,20. This pulling action is established by applying a DC voltage between the moving electrode 220 and one of the fixed electrodes 30,20.

Figure 3:
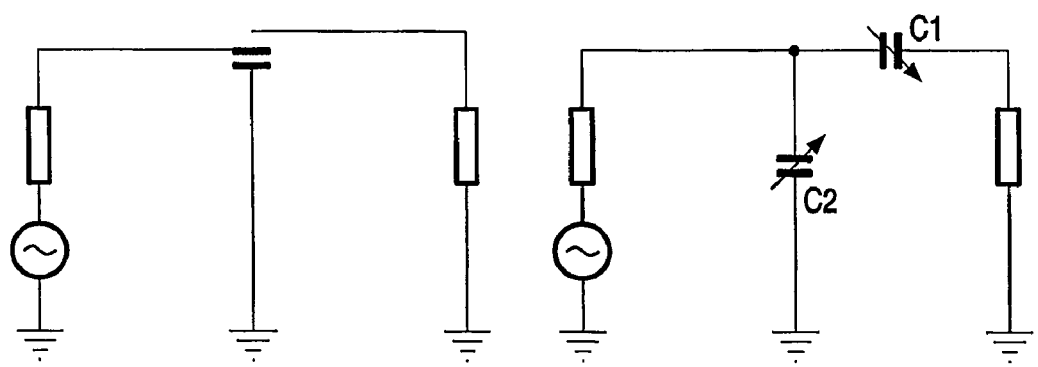
FIG. 3 shows schematic circuit diagrams illustrating the operating configurations of the device of FIG. 2.

In the arrangement shown in FIG. 2, each of the electrodes 30,20, 220 is covered with a dielectric layer 240 so as to avoid a short circuit when the intermediate beam 220 is pulled to one of the fixed electrodes 30,20. The dielectric layer present on the third electrode 220 is a native oxide of $Al_2O_3$ in particular, or any other insulating surface layer. The first electrode 30 and the first conductive face 260 of the beam 220 form, with an intermediate dielectric, a first switchable capacitor C1 that is connected in a signal path between an input and an output. Similarly, the second electrode 20 and the second conductive side face 280 of the beam 220 form, with an intermediate dielectric, a second switchable capacitor C2 that is coupled from the signal path to ground. In this way, the circuit illustrated in FIG. 3 is realized. It can be seen that the device layout of FIG. 2 integrates the shunt and series configuration illustrated and described with reference to FIGS. 1A and 1B into a single device.

Figure 4:
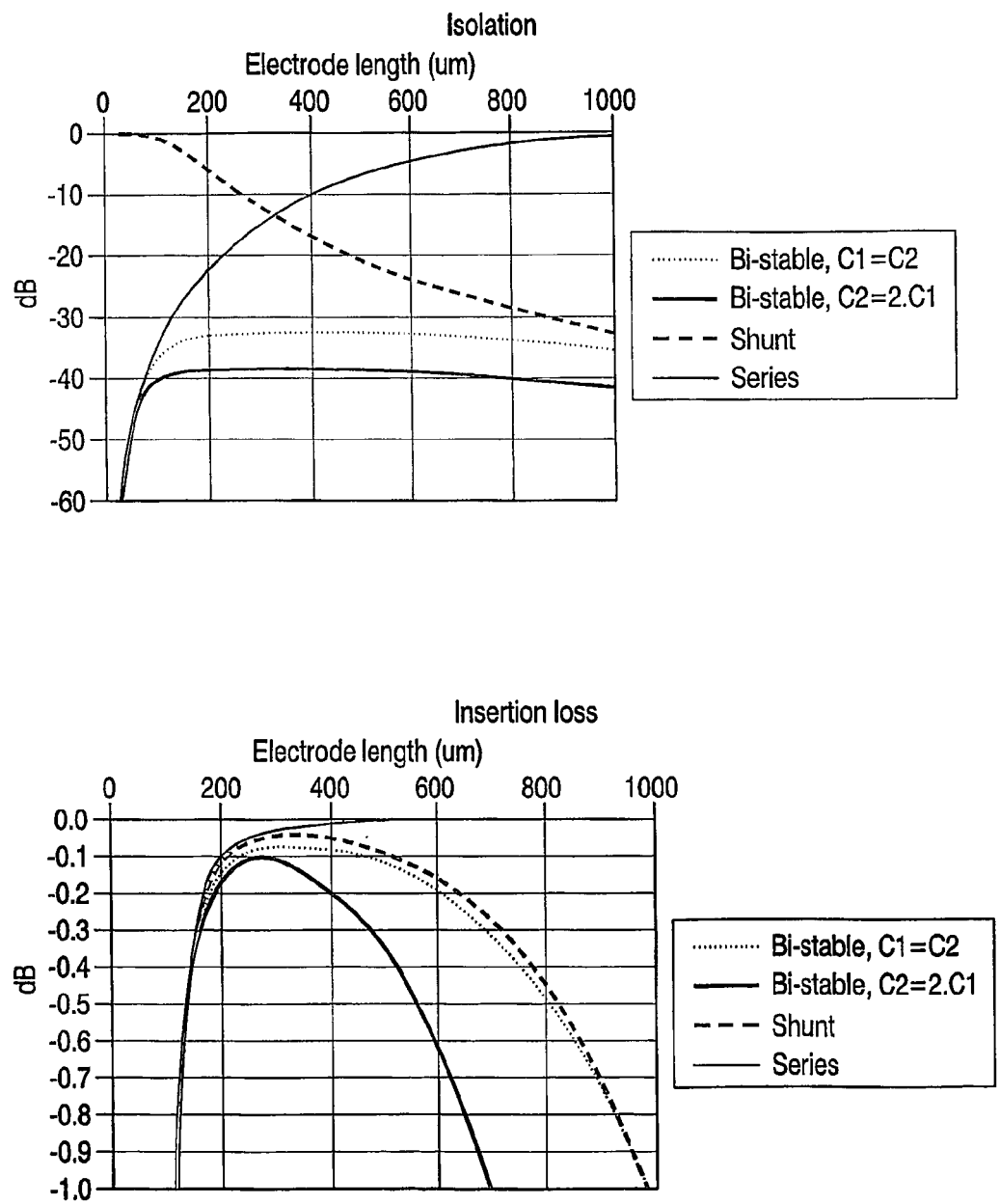
FIG. 4 illustrates graphically that the device of FIG. 2 leads to a significantly higher isolation for a given insertion loss relative to prior art devices.

As a result, the dynamic range of the device 100 is enlarged without compromising the switch size. The device layout also leads to a lower switching voltage combined with a faster switching time. The improved performance of the bi-stable device layout of FIG. 2 compared to a (conventional) single series or shunt switch (as described with reference to FIG. 1) is illustrated graphically in FIG. 4 of the drawings. It can be seen that a bi-stable switch according to the present invention, as shown as an example only with reference to FIG. 2 of the drawings, leads to a significantly higher isolation for a given insertion loss. For example, the series and shunt switches have an isolation of −20 dB for −0.1 dB of insertion loss. However, the bi-stable switch of FIG. 2 with an insertion loss of −0.1 dB has an isolation of −32 dB. It can also be seen that this enhanced performance is achieved without increasing the overall device dimensions with reference to prior art devices.

The switch performance can be further optimized by changing the ratio of the bottom and top electrode areas. For example, in the event that an insertion loss of −0.1 dB is allowed, the ratio of the bottom and top electrode areas can be tuned to achieve the maximum isolation. This leads to a further increase in the isolation, in this case up to −38 dB, as illustrated graphically in FIG. 4 of the drawings. It should be noted that these results were achieved by making $C_1=2C_2$, the data was calculated for a frequency of 900 MHz (GSM band) with a gap between the top and bottom electrode of 2.4 μm. It will be appreciated that the electrode length is equal to the square root of electrode area if square electrodes are assumed.

Figure 5:
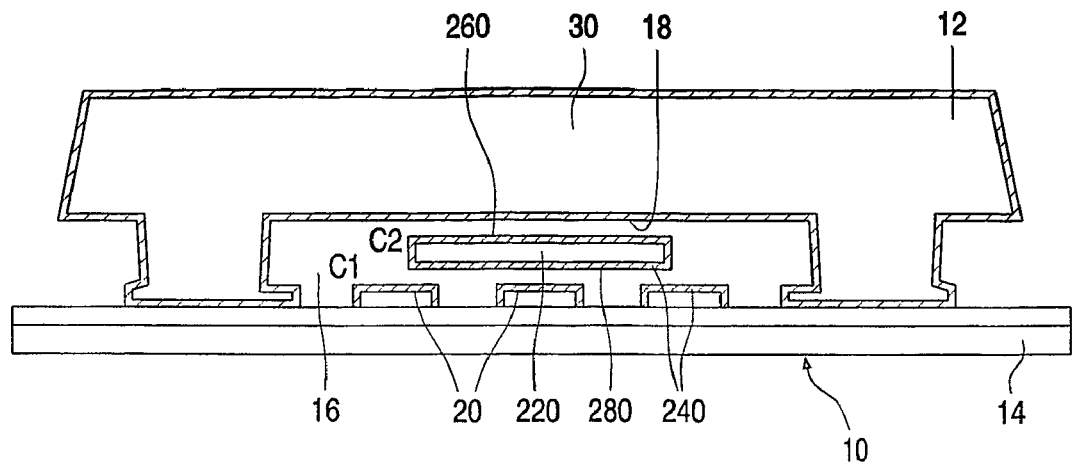
FIG. 5 is a schematic cross-sectional view of a MEMS element according to another exemplary embodiment of the present invention.

Referring to FIG. 5 of the drawings, one way of altering the electrode area is, for example, to segment the bottom electrode 20. However, other methods of achieving the same result are envisaged and the invention is not intended to be limited in this regard.

Because the switch of the present invention is bi-stable, the intermediate beam 220 can be designed to have a relatively low stiffness, which is not the case for conventional switches because, in that case, the movable electrode is required to be self-supporting when the switch is in the open state. Since, in the case of the present invention, the stiffness of the middle electrode can be low, this allows for very low actuation voltages (preferably below battery voltage of a few volts). Furthermore, the bi-stable switch of the present invention leads to an increase in switching speed. For conventional switches, the speed at which the movable electrode is released from the contacting electrode depends only on the spring contact of the movable electrode. Therefore, if the switching speed of a conventional switch is required to be relatively fast, then the movable electrode must have a relatively high stiffness, which in turn requires a high actuation voltage. However, in the case of the bi-stable switch of the present invention, the speed at which the middle electrode 220 can be detached from the contacting electrode 20, 30 is increased by applying a voltage between the middle electrode 220 and the opposing electrode 20, 30, such that there is no need for the movable electrode to have a high spring constant.

In general, in the process of manufacturing the electronic device comprising a MEMS element, firstly one or more sacrificial release layers 300 are provided and patterned adequately. Then a top layer 12 is provided, by sputtering or PVD deposition of an aluminum layer at raised temperature (say 400 degrees centigrade). This top layer 12 is relatively thick, compared with the normal thickness of thin films, generally 1-10 micrometers. This layer includes any interconnects and support structures to the substrate 14 (however, it will be appreciated that several different configurations are envisaged in this respect, and the invention is not intended to be limited in this regard).

Next, the top layer 12 is structured using photolithography and etching, for example, wet chemical etching, so as to define first electrode 30. Then the release layer 300 is removed in, for example, a further chemical etching step, so as to render the first electrode 30 and the third electrode 220 free-standing. Following this, the MEMS element 10 is packaged hermetically, since moisture and the like tends to have a detrimental effect on the functionality of the device. Such packaging may generally be achieved by means of a solder ring, and implemented by providing the solder first, and thereafter reflowing the solder by passing the device through a reflow oven at about 250-300 degrees centigrade.

Figure 6:
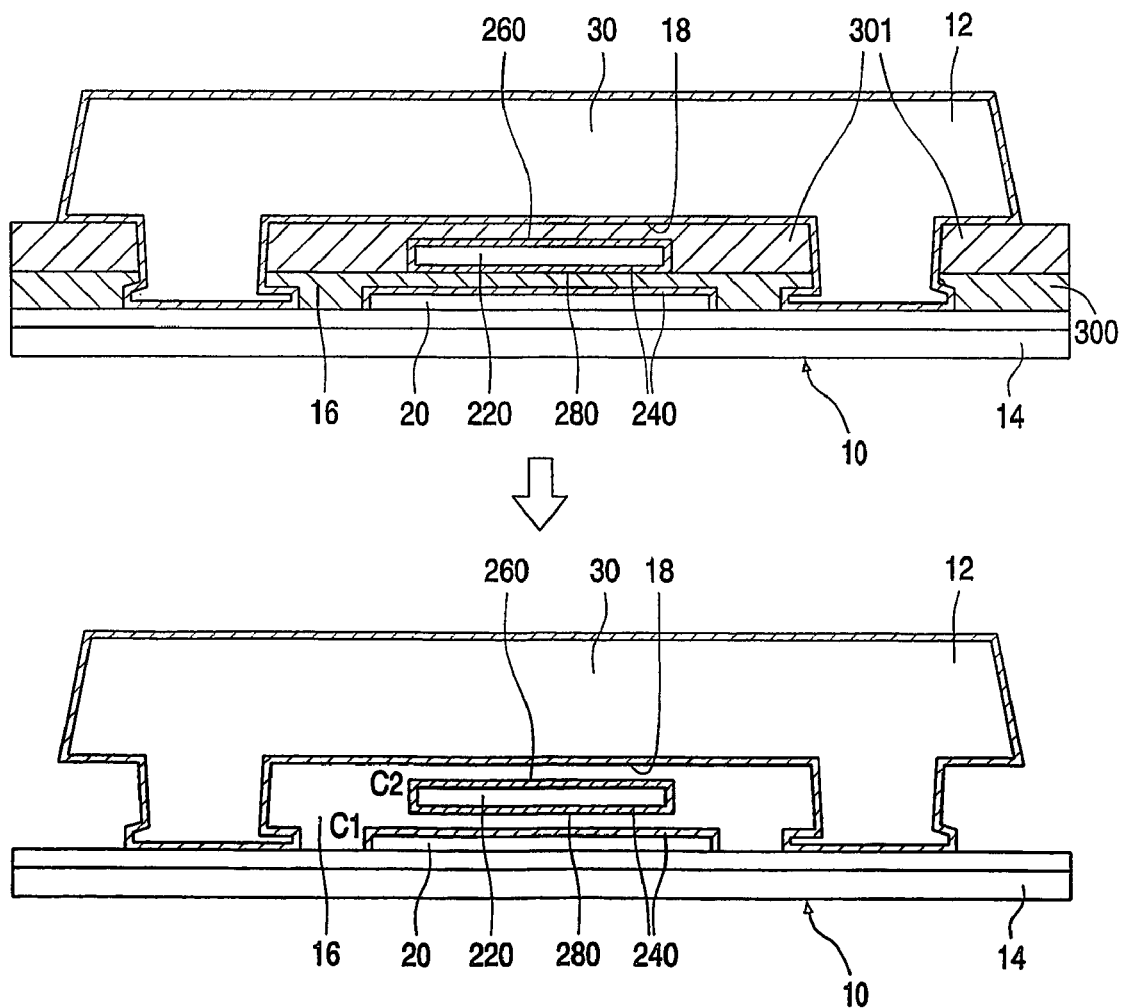
FIG. 6 illustrates schematically the manufacturing flow for realizing the device of FIG. 2.

Referring to FIG. 6 of the drawings, a method of manufacturing the device of FIG. 2 will now be briefly elaborated upon. The substrate 14 is provided with a thermal oxide layer 142 on top of a high-ohmic silicon substrate 141. Hereon a first layer of aluminum is provided, with a thickness of about 0.3 μm. This layer is structured photolithographically according to a desired pattern. This results in the second electrode 20, which in this example is segmented. Hereon, a first sacrificial layer 300 of silicon nitride is provided in a thickness of again approximately 0.5 μm. On top of this first sacrificial layer 300 a second metal layer is provided according to a desired pattern. The pattern includes the third electrode 220. Thereon, a further sacrificial layer 301 is applied, again of silicon nitride, which is deposited using PECVD. This layer 301 has a thickness of for instance 1 μm. If desired, a further insulating layer 302 (shown in FIG. 7) can be applied on top of this layer. This is particularly suitable if the MEMS element is integrated with a passive network and the body 12 is also used for definition of other components. This further insulating layer 302 comprises a different material than the first and second sacrificial layers 300, 301, for instance silicon oxide, an organically modified mesoporous silica, such as known from WO-A 03/024869, benzocyclobutene, or a photoresist material. This further insulating layer 302 will be patterned such that it is absent in the area of the MEMS element. Before or after this patterning, the second sacrificial layer 301 will be patterned with reactive ion etching according to a desired pattern. The pattern creates windows to the first and second metal layer. Then a third metal layer 12 is provided, which will also fill the windows. This metal layer of $Al_{0.98}Cu_{0.02}$ of about 1.0-1.5 µm is given a beam-like structure so as to define the first electrode 30. The first electrode 30 preferably has a bridging structure. Thereafter, a further photosensitive layer is applied. It is patterned such that it creates windows to the selective locations of the first and second sacrificial layers 300, 301. The sacrificial layers 300, 301 can thereafter be removed by using a plasma, in particular a fluorine-based plasma. In this case, the insulating top layer 142 of the substrate further comprises an etch stop layer against such plasma, for instance a layer of $Al_2O_3$. It is noted that it is alternatively possible to use wet-chemical methods, or combinations of wet- and dry-chemical etching.

As stated above, a dielectric layer 240, 180 covering the metal layers is used to avoid a short circuit between the electrodes when the middle electrode 220 is pulled to one of the fixed electrodes 30,20. In the case of aluminum (Al) being used to define the electrodes 30, 20, 220, the native Al-oxide functions as the dielectric (bearing in mind that the breakdown voltage of native Al-oxide>7V, as deduced from experimental data).

Figure 7:
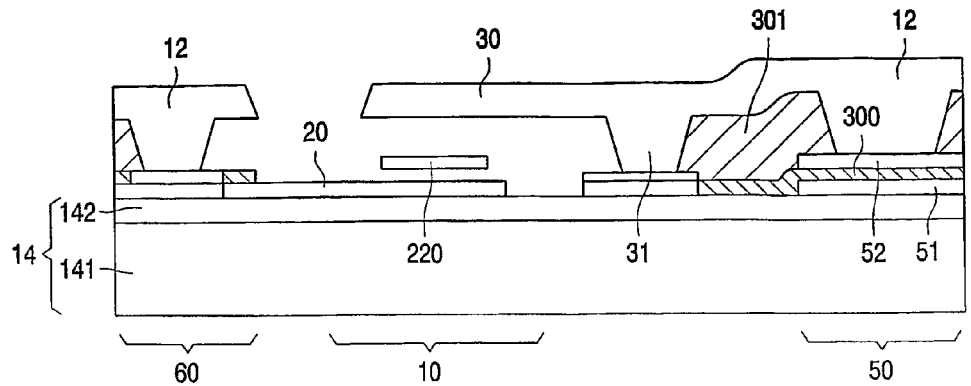
FIG. 7 shows diagrammatically a cross-sectional view of a second embodiment of the device of the invention.

FIG. 7 shows a second embodiment of the device of the invention, which comprises a MEMS element 10, a thin film capacitor 50 and a vertical interconnect 60. This figure illustrates the advantageous feature of the invention, that the MEMS element having three electrodes 30,20, 220 can be embedded in a passive network that comprises other components as well, and without the need to apply any additional metal layer, or sacrificial layer. In fact, the first sacrificial layer 300 functions also as a dielectric of the thin-film capacitor 50. The electrodes 51,52 of the thin-film capacitor 50 are defined in the same metal layers as the second and the third electrode of the MEMS element 10. The third metal layer 12 is not only first electrode 30, but also interconnect. It is herein of particular importance, that the first and second sacrificial layers 300, 301 are selectively etched away. It is therewith improved in that not just one aperture in the body 12 is present, but a plurality of apertures; and in that the supporting structure has a substantial extension, i.e. it is primarily wall-shaped and not pillar-shaped.

Figure 8:
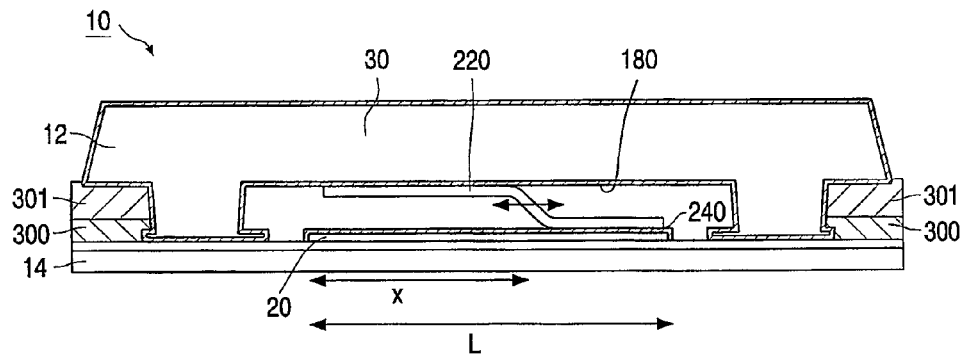
FIG. 8 shows diagrammatically a cross-sectional view of a third embodiment of the device of the invention.
Figure 9:
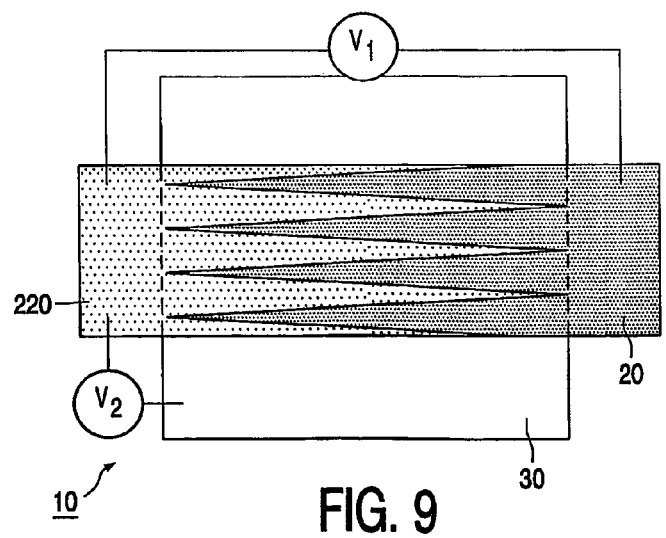
FIG. 9 shows diagrammatically a top view of the third embodiment shown in FIG. 8.

FIG. 8 shows a third embodiment of a MEMS element in a cross-sectional view. FIG. 9 shows a top view of this embodiment, wherein the first, second and third electrodes 30, 20, 220 are shown on top of each other. Herein, the third electrode 220 is elastic, which means that its mechanical force can be overcome by application of a driving voltage. The second electrode 20 is herein patterned so as to contain a plurality of triangular segments. As a result, the surface area of the second electrode 20 is different from that of the first electrode 30. The first and second electrodes 30,20 are furthermore provided with surface layers 240, 180 of dielectric material, as the present example is a variable capacitor. The position of the third electrode 220 is the result of the balance of forces. These forces include primarily Van der Waals forces, electromagnetic forces and the internal mechanical force of the third electrode 220. Since this electrode 220 is relatively thin and flexible, its internal mechanical force can be neglected to a large extent. The position can then be defined and changed by variation of the ratio of the voltages applied to the first and the second electrodes 30,20. The surface layers 180, 240 provided on the first and second electrodes 30,20, and particularly the surface roughness thereof, will strongly determine the strength of the Van der Waals forces, and therewith the resistance against any change of position. Due to the triangular segmentation of the second electrode 20, the nett electrostatic attraction force between the second and the third electrode 20, 220 depends on the in-plane coordinates. In other words, this triangular segmentation provides an embedded tendency that at the one end—left in the drawing—of the third electrode 220 it will be attached to the first, top electrode 30. At the other end of the third electrode 220, the force to the second electrode 20 is much larger, however, and the third electrode 220 will be attached to the second electrode 20. Herewith, a mechanism is provided which ensures that the third electrode 220 is never completely sticted to either the second electrode 20 or the first electrode 30.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electronic device comprising a microelectromechanical system (MEMS) element, the element comprising first and second electrodes wherein the first electrode has a surface area larger than that of the second electrode to improve isolation and an intermediate beam with first and second opposing conductive side faces, the first side face facing the first electrode and the second side face facing the second electrode, which beam is movable by application of a driving voltage between said first and second electrodes, wherein the beam is embodied as a third electrode wherein the third electrode is substantially elastic, such as to be attachable with a first surface area at one edge to the second electrode and with a second surface area at an opposite edge to the first electrode, and such that on application of an actuation voltage the ratio of first to second surface area is changeable; and characterized in that: the second electrode and the second conductive side face of the beam form with an intermediate dielectric a first switchable capacitor that is connected in a signal path between an input and an output, and the first electrode and the first side face of the beam form with an intermediate dielectric a second switchable capacitor, that is coupled from the signal path to ground.

2. An electronic device as claimed in claim 1, wherein the second electrode is subdivided into individual segments.

3. An electronic device as claimed in claim 1, wherein the electrodes are present in planes substantially parallel to a substrate.

4. An electronic device as claimed in claim 3, wherein the second electrode is present between the beam and the substrate and the first electrode is embodied in a layer with a spring constant that is substantially larger than the spring constant of the beam.

5. An electronic device as claimed in claim 4, wherein the first electrode is defined in a layer in which also an inductor is defined.

6. An electronic device as claimed in claim 4, characterized in that the first electrode is constructed as a bridge with supporting spacers on the substrate.

7. An electronic device as claimed in claim 4, wherein the first electrode is part of a membrane- or bridge-like construction that is supported on the substrate with a number of beams laterally connected to said construction, therewith including a spring-like functionality that allows controlled displacement of the first electrode in directions substantially perpendicular to the substrate.

8. An electronic device as claimed in claim 1, wherein the conductive side faces of the beam are connected to the input and the first electrode functions as the output.

9. An electronic device as claimed in claim 1, wherein the third electrode is provided with an electrically insulating layer at both the first and the second side faces.

10. An electronic device as claimed in claim 1, wherein the first and the third electrodes are defined in layers, in which also the electrodes of a thin film capacitor are defined.

11. An electronic device as claimed in claim 1, wherein the MEMS element is part of an impedance matching network.

12. A front end module provided with a power amplifier and an electronic device according to claim 1.

13. Use of the electronic device according to claim 1, for RF applications, wherein the beam is driven by a driving voltage towards or from the first electrode.

14. A method of driving an electronic device as claimed in claim 1 by application of an actuation voltage.

15. An electronic device comprising a passive network which includes thin film components and a microelectromechanical systems (MEMS) element provided on a substrate, the MEMS element comprising first and second electrodes wherein the second electrode is provided with a surface area that is smaller than that of the first electrode, which electrodes are provided in planes that are substantially parallel to the substrate, an intermediate beam being provided between said first and second electrodes, said intermediate beam having first and second opposing conductive side faces, the first side face facing the first electrode and the second side face facing the second electrode, which beam is movable by application of a driving voltage between said first and second electrodes; wherein the first and second conductive side faces are part of the same electrically conductive layer being a third electrode and wherein a sacrificial layer used in the manufacture of the MEMS element forms a dielectric layer of the thin film components, and the layers of the second and third electrode also define electrodes of the thin film components.

16. An electronic device as claimed in claim 15, wherein the second electrode is present between the third electrode and the substrate and the first electrode is embodied in a layer with a spring constant that is substantially larger than the spring constant of the third electrode.

17. An electronic device as claimed in claim 15, wherein the second electrode is subdivided into individual segments.

* * * * *